A. A. MARTELL.
MOUNTING FOR REAMER BLADES.
APPLICATION FILED MAY 20, 1918.
1,383,835.
Patented July 5, 1921.
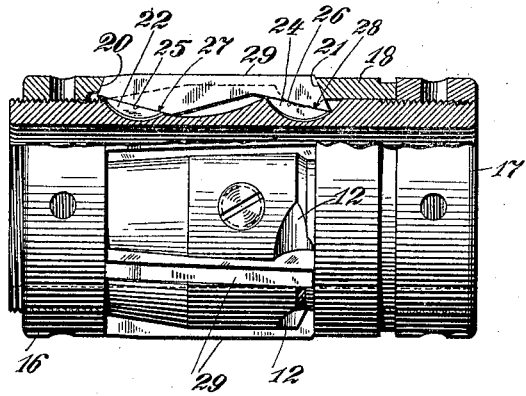
Fig. 1.
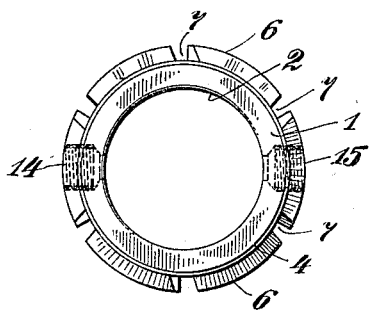
Fig. 3.
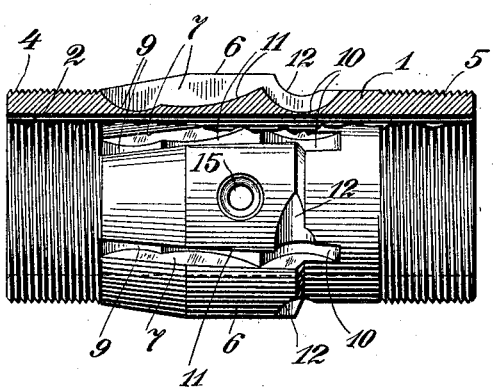
Fig. 2.
Fig. 4.
Fig. 5.
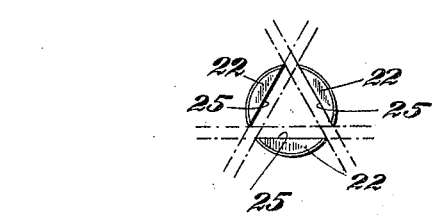
Albert A. Martell
Inventor
George Ramsey
By Attorney

UNITED STATES PATENT OFFICE.

ALBERT A. MARTELL, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

MOUNTING FOR REAMER-BLADES.

1,383,835. Specification of Letters Patent. Patented July 5, 1921.

Application filed May 20, 1918. Serial No. 235,501.

*To all whom it may concern:*

Be it known that I, ALBERT A. MARTELL, a citizen of the United States, residing at Woonsocket, in the county of Providence, State of Rhode Island, have invented certain new and useful Improvements in Mountings for Reamer-Blades, of which the following is a specification.

This invention relates broadly to reamers and more particularly to reamer blade mounts and comprises an improvement on my Patent No. 1,193,583, granted August 8th, 1916.

The principal object of the present invention is to provide a rigid, accurate, self-adjusting mount for supporting reamer blades in a suitable body.

Another object of the present invention is a reamer blade mount as specified and comprising a rocking member forming the seat between the base of a reamer blade and a suitable body member.

A further object of the present invention is a blade support as specified wherein the support comprises a segmental member seated in a curved opening and adapted to automatically adjust the plane supporting surface on the member to correspond to a carrying surface on the blade and adapted to determine the radial movement of a blade when the blade is adjusted.

A still further and more specific object of the present invention comprises a plurality of mounts as specified arranged in the base of a blade slot and adapted to constitute the sole base supports for the blade.

A still further object of the present invention comprises mounts of the character specified magnetically charged to comprise permanent magnets whereby said supports are adapted to be retained in position when the cutting blades are removed.

Another important object of the present invention is a reamer body provided with a plurality of blade-carrying slots thereon with the bases of said slots curved to form portions of cylindrical surfaces adapted to support rocking sectors on which adjustment angular surfaces of the cutting blades are mounted.

A more specific object of the present invention is an adjustable reamer constructed with a body portion adapted to carry reamer blades which have bases constructed with angular portions of predetermined angles relative to the cutting edge thereof, and with rocking supports carried by the body portion and in contact with the angular surfaces on the blades, whereby longitudinal movement of the blades produces a radial adjustment relative to the axis of the body portion.

The present invention possesses many other advantageous features, some of which, with the foregoing, will be set forth more at length in the following description, wherein will be outlined in full that form of the invention which I have selected for illustration in the drawings accompanying and forming a part of the present specification.

In the drawings I have shown only one specific form of my generic invention, but it is to be understood that I do not limit myself to such form, because my invention may be embodied in a multiplicity of forms, each being a species of my invention. It is also to be understood that by the claims succeeding the description of my invention I desire to cover the invention in whatsoever form it may be embodied.

Referring now to the drawings, wherein like reference characters refer to like parts throughout the several figures thereof—

Figure 1 is a view illustrating the reamer assembled with a portion thereof broken away to show the mounting for one blade.

Fig. 2 is a detail view of the body portion showing a part broken away to more clearly show the blade holding slot.

Fig. 3 is an end view of the body portion shown in Fig. 2.

Fig. 4 is a side view of a blade.

Fig. 5 is a view illustrating blade-supporting blocks showing the manner in which these blocks may be cut from a suitable metal disk.

Heretofore in the art of adjustable reamers there have been generally two types; one comprising a body portion formed with an inclined base slot in which an inclined base reamer blade is seated, and with the ends of the body portion screw-threaded and carrying adjustment collars contacting with the end of the blade, so that adjustment of the collars produced a longitudinal movement of the blade, whereby the sliding of the inclined base of the blade on the inclined surface of the body portion caused radial movement of the cutting edge of the blade. Great difficulty was encountered in this type of reamer in finishing the base of the groove to an exact plane inclined surface. Also, if for any reason, this surface became injured or worn, the only repair possible was a whole new body portion. The other type of adjustable reamer comprised detachable inclined surfaces or wedges, adapted to be seated in the base of a slot and to contact with only a portion of the base of the reamer blade. An example of this type is disclosed in my prior Patent No. 1,193,583, August 8, 1916. In this type of reamer it is essential that the surfaces on the wedge supports be ground with great exactness and to correspond accurately to the inclined surfaces on the reamer blades. This type possesses many advantages over the first-mentioned type of reamer, but also possesses the disadvantage of not being strictly interchangeable unless the parts are made with great care, which adds to the expense of manufacture.

The present invention overcomes the difficulties of the prior art by forming the blade supports as segments of a disk of metal and mounting these segments in curved seats corresponding to the curvature of the segment, which permits the segment to rock in the seat and to allow the contact surface thereof to accurately engage and seat against inclined surfaces on the blades. By means of this construction a perfect fit of the parts is accomplished, since the parts are constructed to be self-adjusting and without necessitating an expensive manufacturing operation. In fact, the manufacturing operations are reduced in the amount of skill required, in the time, and in cost.

Referring now more particularly to the drawings the body portion 1 is formed with a longitudinal opening 2 adapted to receive the reamer shaft for carrying the reamer, and is screw threaded on the forward end, as at 4, and on the rear end, as at 5. The body portion between the ends is enlarged as at 6 to form a blade-supporting portion. This blade-supporting portion is provided with a plurality of slots 7 the longitudinal axes of which are angularly disposed relative to planes including the longitudinal axis of the opening 2 and with adjacent slots oppositely inclined and with diametrically opposite slots of the same inclination. The bases of these slots are formed by means of circular cutters, such as are commonly employed on milling machines, with the ends of these bases, as at 9 and 10, formed on a relatively small radius and the middle portion, as at 11, on relatively large radius. Preferably the end portions are cut on exactly the same radius. For extremely fine work it is desirable that these end portions be ground to comprise smooth accurate seats.

In order to facilitate cutting of these end portions a part of the metal between the slots, as at 12, may be cut away. Stub-screw openings 14 and 15 are provided on each side of the body portion to facilitate clamping the reamer on a suitable reamer shaft.

Referring now more particularly to Fig. 1 a front nut or collar 16 is shown in position on the screw threads 4, and a rear screw-threaded adjustment nut 17 is shown in position on the screw thread 5 and in engagement with a smooth interior surfaced collar 18 which is adapted to slide over the rear part of the body portion. Blades 29 having inclined ends 20 and 21, are mounted in the slots 7 between the front nut 16 and the smooth ring 18 with the chamfered or inclined surfaces of these members in engagement with the inclined ends of the blades whereby tightening of the nuts forces the blades radially inward. This radial inward force is sustained on pairs of segmental rocking rests or seats 22 and 24, which are seated in the curved portions 9 and 10 of the slots and adapted to rock therein so that the top faces or surfaces 25 and 26 are seated for their entire length against the inclined surfaces 27 and 28 on the ends of the blades 29. By this construction it will be seen that a very solid foundation is formed for the blade in view of the fact that the contacting surfaces are self-adjusting. In the manufacture of the blades pieces of fine tool steel are set up in a suitable grinding machine and the surfaces 27 and 28, opposite to the cutting surface 29, are very accurately ground to constitute plane surfaces which are disposed at exactly the same angle to the straight part of the cutting edge 29. The segmental rocking rests may be formed by making a disk of suitable steel or other metal; then cutting segments from this disk, as indicated in Fig. 5; then hardening these segments and grinding the flat portions of the segments to true plane surfaces. After the flat portions have been accurately ground the segments may then be mounted on a suitable arbor and the curved portions be ground to exactly the same curvature as the seats 9 and 10 in the body portion. In order to facilitate assembly of the parts it is desirable that the segmental supports be magnetized so that when placed in position in the seats on the body portion they will remain therein while the blades are being inserted.

From the foregoing description it is to be noted that the present invention provides a tool of great strength and accuracy, and wherein aging of the metal parts will not cause distortion, which otherwise might destroy the accuracy of adjustments. Because of the delicate and accurate work required of reamers it is essential that accuracy and certainty be maintained throughout the limits of adjustment of the tool and such accuracy and strength are secured automatically by the rocking segment supports and curved segment seats.

What I claim is:

1. In a device of the character described, a body member provided with blade holding slots the bases of said slots comprising portions of cylindrical concave surfaces, blades adapted to be mounted in said slots, means for moving said blades longitudinally of said body member, parallel inclined surfaces on the bases of said blades, in combination with segmental rocking supports having flat supporting surfaces for said blades and mounted within certain of said concave portions of the slots with the flat part of said rocking supports in contact with the inclined surfaces on said blades.

2. In a device of the character described a body member being provided with a plurality of blade holding slots extending longitudinally thereof, blades mounted in said slots and adapted to be longitudinally movable therein, rocking supports comprising segmental members mounted in said slots and adapted to support said blades, and screw-threaded means carried by said body member and adapted to move said blades on said supports to produce a radial adjustment of the cutting edges of said blades relatively to the axis of the body member.

3. In a device of the character specified a body member having a plurality of slots therein, said slots being provided at each end with curved bottom recesses, a plurality of blades, one being mounted in each slot and adapted to be longitudinally and radially adjustable therein, a pair of parallel inclined surfaces on the base of each blade, in combination with a pair of rocking supports comprising segmental members carried by said body member within said curved recesses and having upper plane surfaces of the supports in contact with the inclined surfaces on said blades, and means carried by said body member to clamp said blades against said rocking supports.

4. A reamer comprising a body member, segmental members having plane engaging surfaces, said body portion being provided with a blade retaining slot and a blade mounted to engage said surfaces and to be adjusted thereby, said members being seated in said slot and being removable from said body portion and capable of slight rotatable movements on said body member.

5. An expansible tool comprising a slotted body member, a blade having inclined portions, rocking segmental members having flat engaging surfaces to support said blade, said members being seated in said slots in the body portion and removable transversely therefrom, and means to normally maintain said blade seated against said members.

6. An expansible tool comprising a body member, a blade having inclined portions, means to move the blade longitudinally of the body, a plurality of segmental shaped rocking members for adjusting said blade during the longitudinal movement, said members seating against said inclined portions on the blade and being capable of limited rocking movement relative to said body member and being removable transversely from said body member, but prevented from longitudinal movement relative to said body member.

7. In a device of the character described a body member provided with blade holding slots, blades adapted to be mounted in said slots, means for moving said blades longitudinally of said body member, parallel inclined surfaces on the bases of said blades, in combination with rocking supports for said blades mounted on said body member and in contact with the inclined surfaces on said blades.

8. A device of the character specified comprising a body portion provided with a plurality of blade holding slots, blades mounted in said slots for longitudinal and radial movement therein, parallel inclined surfaces on the bases of said blades, in combination with rocking supports mounted in said slots and in contact with the inclined surfaces on the bases of said blades, and means for sliding said blades relatively to said supports.

9. A device of the character specified comprising a body portion, a plurality of slots extending longitudinally of said body portion, a plurality of blades mounted in said slots, in combination with a plurality of rocking supports in the bottoms of said slots, and means for clamping said blades in position against said supports, with the supporting faces contacting with the rocking supports being inclined to the cutting edges of the blades.

ALBERT A. MARTELL.